(12) United States Patent
Sakarda

(10) Patent No.: US 9,141,394 B2
(45) Date of Patent: Sep. 22, 2015

(54) SWITCHING BETWEEN PROCESSOR CACHE AND RANDOM-ACCESS MEMORY

(75) Inventor: Premanand Sakarda, Acton, MA (US)

(73) Assignee: Marvell World Trade Ltd., St. Michael (BB)

( * ) Notice: Subject to any disclaimer, the term of this patent is extended or adjusted under 35 U.S.C. 154(b) by 378 days.

(21) Appl. No.: 13/552,421

(22) Filed: Jul. 18, 2012

(65) Prior Publication Data

US 2013/0031346 A1 Jan. 31, 2013

Related U.S. Application Data

(60) Provisional application No. 61/513,443, filed on Jul. 29, 2011.

(51) Int. Cl.
*G06F 9/44* (2006.01)

(52) U.S. Cl.
CPC ...... *G06F 9/4401* (2013.01); *G06F 2212/2515* (2013.01)

(58) Field of Classification Search
CPC .................. G06F 2212/2515; G06F 2212/221
See application file for complete search history.

(56) References Cited

U.S. PATENT DOCUMENTS

| | | | |
|---|---|---|---|
| 5,155,833 A * | 10/1992 | Cullison et al. .................. 713/2 |
| 5,390,165 A | 2/1995 | Tuch | |
| 5,481,733 A | 1/1996 | Douglis et al. | |
| 5,617,118 A | 4/1997 | Thompson | |
| 5,673,416 A | 9/1997 | Chee et al. | |
| 5,696,989 A | 12/1997 | Miura et al. | |
| 5,771,356 A | 6/1998 | Leger et al. | |
| 5,828,835 A | 10/1998 | Isfeld et al. | |
| 5,884,099 A | 3/1999 | Klingelhofer | |
| 6,014,722 A | 1/2000 | Rudin et al. | |
| 6,092,108 A | 7/2000 | DiPlacido et al. | |
| 6,145,069 A | 11/2000 | Dye | |
| 6,230,277 B1 | 5/2001 | Nakaoka et al. | |
| 6,330,626 B1 | 12/2001 | Dennin et al. | |

(Continued)

FOREIGN PATENT DOCUMENTS

| | | |
|---|---|---|
| CN | 1140272 | 1/1997 |
| CN | 102272734 | 9/2014 |

(Continued)

OTHER PUBLICATIONS

"Final Office Action", U.S. Appl. No. 13/863,079, May 7, 2014, 7 pages.

(Continued)

*Primary Examiner* — Paul Yanchus, III
*Assistant Examiner* — Joshua Neveln

(57) ABSTRACT

The present disclosure describes techniques and apparatuses for switching between processor cache and random-access memory. In some aspects, the techniques and apparatuses are able to reduce die size of application-specific components by forgoing dedicated random-access memory (RAM). Instead of using dedicated RAM, a memory having a cache configuration is reconfigured to a RAM configuration during operations of the application-specific component and then, when the operations are complete, the memory is configured back to the cache configuration. Because many application-specific components already include memory having the cache configuration, reconfiguring this memory rather than including a dedicated RAM reduces die size for the application component.

17 Claims, 7 Drawing Sheets

(56) References Cited

U.S. PATENT DOCUMENTS

| | | | |
|---|---|---|---|
| 6,463,509 B1 | 10/2002 | Teoman et al. | |
| 6,564,318 B1 | 5/2003 | Gharda et al. | |
| 6,601,167 B1 | 7/2003 | Gibson et al. | |
| 6,678,790 B1* | 1/2004 | Kumar | 711/118 |
| 6,711,447 B1 | 3/2004 | Saeed | |
| 6,756,988 B1 | 6/2004 | Wang et al. | |
| 6,823,472 B1 | 11/2004 | DeKoning et al. | |
| 6,832,280 B2 | 12/2004 | Malik et al. | |
| 6,901,298 B1 | 5/2005 | Govindaraj et al. | |
| 7,089,419 B2 | 8/2006 | Foster et al. | |
| 7,103,788 B1 | 9/2006 | Souza et al. | |
| 7,126,913 B1 | 10/2006 | Patel et al. | |
| 7,194,638 B1 | 3/2007 | Larky | |
| 7,266,842 B2 | 9/2007 | Foster et al. | |
| 7,299,365 B2 | 11/2007 | Evans | |
| 7,308,591 B2 | 12/2007 | Dubinsky | |
| 7,356,707 B2 | 4/2008 | Foster et al. | |
| 7,496,952 B2 | 2/2009 | Edwards et al. | |
| 7,571,216 B1 | 8/2009 | McRae et al. | |
| 7,596,614 B2 | 9/2009 | Saunderson et al. | |
| 7,606,230 B1 | 10/2009 | Cohen et al. | |
| 7,620,784 B2 | 11/2009 | Panabaker | |
| 7,774,635 B2 | 8/2010 | Shiota | |
| 7,788,670 B2 | 8/2010 | Bodas et al. | |
| 7,818,389 B1 | 10/2010 | Chiang et al. | |
| 7,873,841 B2 | 1/2011 | Mullis, II et al. | |
| 7,898,857 B2 | 3/2011 | Kirsch et al. | |
| 7,995,596 B2 | 8/2011 | Kuila et al. | |
| 8,000,284 B2 | 8/2011 | Lott et al. | |
| 8,001,592 B2 | 8/2011 | Hatakeyama | |
| 8,095,816 B1 | 1/2012 | Chan | |
| 8,117,478 B2 | 2/2012 | Liu et al. | |
| 8,139,521 B2 | 3/2012 | Mukherjee et al. | |
| 8,171,309 B1 | 5/2012 | Poo | |
| 8,296,555 B2 | 10/2012 | Chu | |
| 8,321,706 B2 | 11/2012 | Zhang | |
| 8,327,056 B1 | 12/2012 | Chan | |
| 8,443,187 B1 | 5/2013 | Orr | |
| 8,443,211 B2 | 5/2013 | Zhao et al. | |
| 8,510,560 B1 | 8/2013 | Lambert et al. | |
| 8,688,968 B2 | 4/2014 | Chu et al. | |
| 2002/0069354 A1 | 6/2002 | Fallon et al. | |
| 2002/0087816 A1 | 7/2002 | Atkinson et al. | |
| 2003/0014368 A1 | 1/2003 | Leurig et al. | |
| 2003/0200453 A1 | 10/2003 | Foster et al. | |
| 2003/0200454 A1 | 10/2003 | Foster et al. | |
| 2003/0208675 A1 | 11/2003 | Burokas et al. | |
| 2003/0236991 A1 | 12/2003 | Letsinger | |
| 2004/0015621 A1 | 1/2004 | Tanaka | |
| 2004/0103272 A1* | 5/2004 | Zimmer et al. | 713/1 |
| 2004/0125679 A1 | 7/2004 | Kwean | |
| 2004/0158669 A1 | 8/2004 | Weng et al. | |
| 2004/0257462 A1 | 12/2004 | Goris et al. | |
| 2004/0266386 A1 | 12/2004 | Kuo | |
| 2005/0033869 A1 | 2/2005 | Cline | |
| 2005/0055547 A1 | 3/2005 | Kawamura | |
| 2005/0086551 A1 | 4/2005 | Wirasinghe et al. | |
| 2005/0108171 A1 | 5/2005 | Bajikar et al. | |
| 2005/0138365 A1 | 6/2005 | Bellipady et al. | |
| 2005/0156925 A1 | 7/2005 | Fong et al. | |
| 2005/0177674 A1 | 8/2005 | Ober et al. | |
| 2005/0278523 A1 | 12/2005 | Fortin et al. | |
| 2006/0004946 A1 | 1/2006 | Shah et al. | |
| 2006/0036897 A1 | 2/2006 | Lin et al. | |
| 2006/0072748 A1 | 4/2006 | Buer | |
| 2006/0075259 A1 | 4/2006 | Bajikar et al. | |
| 2006/0123248 A1 | 6/2006 | Porter et al. | |
| 2006/0136735 A1 | 6/2006 | Plotkin et al. | |
| 2006/0142906 A1 | 6/2006 | Brozovich et al. | |
| 2006/0156390 A1 | 7/2006 | Baugher | |
| 2006/0253716 A1* | 11/2006 | Dhiman et al. | 713/300 |
| 2006/0259656 A1 | 11/2006 | Sullivan | |
| 2007/0005824 A1 | 1/2007 | Howard | |
| 2007/0011445 A1 | 1/2007 | Waltermann et al. | |
| 2007/0038866 A1 | 2/2007 | Bardsley et al. | |
| 2007/0073915 A1 | 3/2007 | Go et al. | |
| 2007/0097904 A1 | 5/2007 | Mukherjee et al. | |
| 2007/0174602 A1 | 7/2007 | Kao | |
| 2007/0234028 A1 | 10/2007 | Rothman et al. | |
| 2007/0260905 A1 | 11/2007 | Marsden et al. | |
| 2007/0277051 A1 | 11/2007 | Reece et al. | |
| 2007/0297606 A1 | 12/2007 | Tkacik et al. | |
| 2008/0005549 A1 | 1/2008 | Ke | |
| 2008/0016313 A1 | 1/2008 | Murotake et al. | |
| 2008/0028243 A1 | 1/2008 | Morisawa | |
| 2008/0034411 A1 | 2/2008 | Aoyama | |
| 2008/0046732 A1 | 2/2008 | Fu et al. | |
| 2008/0066075 A1 | 3/2008 | Nutter et al. | |
| 2008/0072311 A1 | 3/2008 | Mullick et al. | |
| 2008/0104422 A1 | 5/2008 | Mullis et al. | |
| 2008/0108322 A1 | 5/2008 | Upp | |
| 2008/0120717 A1 | 5/2008 | Shakkarwar | |
| 2008/0165952 A1* | 7/2008 | Smith et al. | 713/1 |
| 2008/0298289 A1 | 12/2008 | Jeyaseelan | |
| 2008/0313462 A1 | 12/2008 | Zhao et al. | |
| 2009/0006658 A1 | 1/2009 | Gough | |
| 2009/0049222 A1 | 2/2009 | Lee et al. | |
| 2009/0199031 A1 | 8/2009 | Zhang | |
| 2009/0254771 A1 | 10/2009 | So et al. | |
| 2009/0327608 A1 | 12/2009 | Eschmann et al. | |
| 2010/0023747 A1 | 1/2010 | Asnaashari et al. | |
| 2010/0058045 A1 | 3/2010 | Borras et al. | |
| 2010/0070751 A1 | 3/2010 | Chue | |
| 2010/0174934 A1 | 7/2010 | Zhao | |
| 2010/0217935 A1* | 8/2010 | Cho et al. | 711/118 |
| 2012/0287337 A1 | 11/2012 | Kumar et al. | |
| 2013/0046966 A1 | 2/2013 | Chu | |
| 2013/0124844 A1 | 5/2013 | Baratam | |

FOREIGN PATENT DOCUMENTS

| | | |
|---|---|---|
| EP | 1847911 | 10/2007 |
| JP | 08076872 | 3/1996 |
| JP | 09044418 | 2/1997 |
| JP | 10320302 | 12/1998 |
| JP | 2002099502 | 4/2002 |
| JP | 2002215409 | 8/2002 |
| JP | 2004005254 | 1/2004 |
| JP | 2005011120 | 1/2005 |
| JP | 5565778 | 6/2014 |
| WO | WO-2013019423 | 2/2013 |
| WO | WO-2013074797 | 5/2013 |

OTHER PUBLICATIONS

"Foreign Decision to Grant", JP Application No. 2011-544456, May 20, 2014, 2 pages.

"EP Intent to Grant", European Patent Application No. 09803951.4, May 14, 2013, 13 Pages.

"Extensions to Direct Link Setup (DLS) Comments", IEEE, P802.11z, Jul. 2009, pp. 1-3.

"Final Office Action", U.S. Appl. No. 12/098,254, May 18, 2011, 11 pages.

"Final Office Action", U.S. Appl. No. 12/541,731, May 31, 2012, 11 pages.

"Final Office Action", U.S. Appl. No. 12/178,268, May 25, 2011, 13 pages.

"Final Office Action", U.S. Appl. No. 12/101,668, May 10, 2012, 8 pages.

"Foreign Office Action", Chinese Application No. 200980136849.9, May 24, 2013, 20 Pages.

"Foreign Office Action", Chinese Application No. 200980153758.6, Apr. 27, 2013, 14 pages.

"Foreign Office Action", Japanese Application No. 2011-527899, Aug. 13, 2013, 2 pages.

"Foreign Office Action", European Patent Application No. 09803951.4, May 24, 2012, 3 pages.

"Foreign Office Action", Japanese Application No. 2011-527899, Nov. 6, 2012, 4 pages.

"Foreign Office Action", Japanese Application No. 2011-527899, Apr. 16, 2013, 5 pages.

(56) References Cited

OTHER PUBLICATIONS

"Foreign Office Action", European Patent Application No. 09803951.4, Dec. 13, 2012, 6 pages.
"Foreign Office Action", Japanese Application No. 2011-544456, Jul. 9, 2013, 6 pages.
"Foreign Office Action", Japanese Application No. 2011-544456, Jan. 29, 2013, 7 pages.
"Non-Final Office Action", U.S. Appl. No. 13/863,079, Jun. 20, 2013, 10 pages.
"Non-Final Office Action", U.S. Appl. No. 12/559,987, Nov. 9, 2011, 10 pages.
"Non-Final Office Action", U.S. Appl. No. 12/178,268, Dec. 22, 2010, 10 pages.
"Non-Final Office Action", U.S. Appl. No. 12/541,731, Sep. 4, 2012, 11 pages.
"Non-Final Office Action", U.S. Appl. No. 13/657,511, Mar. 28, 2013, 13 pages.
"Non-Final Office Action", U.S. Appl. No. 12/178,268, Dec. 21, 2011, 13 pages.
"Non-Final Office Action", U.S. Appl. No. 13/683,056, Nov. 8, 2013, 5 pages.
"Non-Final Office Action", U.S. Appl. No. 13/333,551, Apr. 6, 2012, 5 pages.
"Non-Final Office Action", U.S. Appl. No. 12/636,558, Jan. 10, 2012, 6 pages.
"Non-Final Office Action", U.S. Appl. No. 13/598,282, Oct. 16, 2013, 6 pages.
"Non-Final Office Action", U.S. Appl. No. 12/271,761, Oct. 3, 2011, 6 pages.
"Non-Final Office Action", U.S. Appl. No. 12/101,668, Apr. 5, 2011, 7 pages.
"Non-Final Office Action", U.S. Appl. No. 12/098,254, Jan. 14, 2011, 8 pages.
"Non-Final Office Action", U.S. Appl. No. 12/636,558, May 29, 2012, 8 pages.
"Non-Final Office Action", U.S. Appl. No. 12/101,668, Aug. 9, 2012, 8 pages.
"Non-Final Office Action", U.S. Appl. No. 13/863,079, Oct. 1, 2013, 9 pages.
"Non-Final Office Action", U.S. Appl. No. 12/541,731, Oct. 21, 2011, 9 pages.
"Notice of Allowance", U.S. Appl. No. 12/636,558, Jan. 9, 2013, 4 pages.
"Notice of Allowance", U.S. Appl. No. 12/098,254, Dec. 14, 2011, 4 pages.
"Notice of Allowance", U.S. Appl. No. 13/333,551, May 30, 2012, 4 pages.
"Notice of Allowance", U.S. Appl. No. 12/178,268, Jul. 2, 2012, 4 pages.
"Notice of Allowance", U.S. Appl. No. 12/098,254, Sep. 28, 2011, 4 pages.
"Notice of Allowance", U.S. Appl. No. 12/559,987, Jun. 15, 2012, 5 pages.
"Notice of Allowance", U.S. Appl. No. 12/101,668, Jan. 11, 2013, 6 pages.
"Notice of Allowance", U.S. Appl. No. 12/271,761, Jan. 3, 2012, 6 pages.
"Notice of Allowance", U.S. Appl. No. 12/541,731, Apr. 2, 2013, 8 pages.
"Notice of Allowance", U.S. Appl. No. 13/657,511, Nov. 4, 2013, 9 pages.
"Part 11—Wireless LAN Medium Access Control (MAC) and Physical Layer (PHY) Specfications", Information Technology—Telecommunications & Information Exchange Between Systems . . . International Standard, ISO/IEC 8802-11, First Ed., 1999, pp. 1-531.
"PCT Partial Search Report", Application Serial No. PCT/US2008/078343,Partial International Search, Mar. 5, 2009, 2 pages.
"PCT Search Report", Application No. PCT/US2009/056973, Nov. 4, 2009, 13 pages.
"PCT Search Report", Application Serial No. PCT/US2008/078343, May 18, 2009, 5 pages.
"PCT Search Report and Written Opinion", Application No. PCT/US2009/067767, Mar. 26, 2010, 12 pages.
"PCT Search Report and Written Opinion", Application No. PCT/US2012/065290, May 2, 2013, 9 pages.
"Restriction Requirement", U.S. Appl. No. 12/101,668, Sep. 22, 2011, 6 pages.
"Supplemental Notice of Allowance", U.S. Appl. No. 13/333,551, Oct. 23, 2012, 2 pages.
"Supplemental Notice of Allowance", U.S. Appl. No. 12/101,668, Feb. 8, 2013, 4 Pages.
"PCT Search Report and Written Opinion", Application No. PCT/US2012/047426, Oct. 19, 2012, 7 pages.
"Foreign Office Action", Japanese Application No. 2011-544456, Dec. 3, 2013, 2 pages.
"Foreign Office Action", CN Application No. 200980153758.6, Dec. 30, 2013, 8 pages.
"Foreign Notice of Allowance", CN Application No. 200980153758.6, Jul. 15, 2014, 4 Pages.
"Non-Final Office Action", U.S. Appl. No. 13/863,079, Aug. 27, 2014, 6 pages.
"Final Office Action", U.S. Appl. No. 13/863,079, Jan. 15, 2015, 7 pages.
"Non-Final Office Action", U.S. Appl. No. 13/863,079, Apr. 9, 2015, 7 pages.
"Restriction Requirement", U.S. Appl. No. 13/676,701, Feb. 12, 2015, 7 pages.
"Non-Final Office Action", U.S. Appl. No. 13/676,701, Jul. 31, 2015, 12 pages.

\* cited by examiner

SWITCHING BETWEEN PROCESSOR CACHE AND RANDOM-ACCESS MEMORY

RELATED APPLICATIONS

This present disclosure claims priority to U.S. Provisional Patent Application Ser. No. 61/513,443 filed Jul. 29, 2011, the disclosure of which is incorporated by reference herein in its entirety.

BACKGROUND

The background description provided herein is for the purpose of generally presenting the context of the disclosure. Unless otherwise indicated herein, the approaches described in this section are not prior art to the claims in this disclosure and are not admitted to be prior art by inclusion in this section.

Many conventional system-on-chips (SoCs) include application-specific components, such as application processors and application-specific integrated circuits. These application-specific components are tailored, at least in part, to benefit a specific application, such as through a tailored instruction set or circuitry that provides various functionalities. To continually improve the performance of these application-specific components, more and more functionalities are being added to these application-specific components, thereby increasing die size and production costs.

SUMMARY

This summary is provided to introduce subject matter that is further described below in the Detailed Description and Drawings. Accordingly, this Summary should not be considered to describe essential features nor used to limit the scope of the claimed subject matter.

A System-on-Chip is described that comprises a switchable memory configured to switch between a processor cache configuration and a random-access memory (RAM) configuration and a controller. The controller is configured to dynamically switch, responsive to a power-down event or a power-on event, the switchable memory from the processor cache configuration to the RAM configuration, load boot code from a non-volatile memory into the switchable memory while the switchable memory is in the RAM configuration, execute the boot code from the switchable memory while the switchable memory is in the RAM configuration, and dynamically switch, responsive to completion of the execution of the boot code from the switchable memory, the switchable memory from the RAM configuration to the processor cache configuration.

A method is described comprising, responsive to a power-on event, switching a switchable memory from a processor cache configuration to a random-access memory (RAM) configuration, loading boot code from a non-volatile memory to the switchable memory configured to the RAM configuration, executing a first portion of the boot code from the switchable memory effective to detect and configure a boot device having an operating system image, executing a second portion of the boot code from the switchable memory effective to boot the operating system image from the boot device, and after booting the operating system image from the boot device, switching the switchable memory from the RAM configuration to the processor cache configuration.

BRIEF DESCRIPTION OF THE DRAWINGS

The details of one or more implementations are set forth in the accompanying figures and the detailed description below.

In the figures, the left-most digit of a reference number identifies the figure in which the reference number first appears. The use of the same reference numbers in different instances in the description and the figures indicate like elements.

DETAILED DESCRIPTION

Overview

This document describes techniques and apparatuses for switching memory between processor cache and random-access memory. These techniques and apparatuses, in some aspects, enable a reduction in die size of application-specific components, which, in many cases, reduces production costs or improves performance. In some aspects, the techniques and apparatuses are able to reduce die size by forgoing dedicated random-access memory (RAM) while still enabling the application-specific components to perform its operations. Instead of using dedicated RAM, a memory having a cache configuration is reconfigured to a RAM configuration during the operations and then, when the operations are complete, is configured back to the cache configuration. Because application-specific components already include memory having the cache configuration, reconfiguring this memory rather than including a dedicated RAM reduces die size for the application component.

For example, consider an application-specific component tailored to a mobile device, such as a smart-phone that also includes a cellular or baseband processor. When the smart-phone is first turned on or when resuming from a hibernate or suspend state, an operating system of the smart-phone may be booted or resumed by an application-specific component. This application-specific component conventionally includes a read-only memory (ROM) having boot code (a boot ROM), random-access memory (RAM) into which the boot code is loaded, a boot device having an operating system image, and a processor to execute the boot code once loaded into the RAM. For this application-specific component, the processor loads the boot code into the RAM and then executes the boot code from the RAM to detect the boot device, configure the boot device, authenticate the operating system, and boot the operating system.

The techniques and apparatuses, however, enable the application-specific component to boot the operating system without using the conventional RAM. Instead, a memory configured to an L2 cache configuration is reconfigured prior to or during the boot process to a static RAM (SRAM) configuration. The boot code is loaded into the memory in the SRAM configuration, which is then executed by the processor to boot the operating system. After the operating system is booted, the memory is switched back to the L2 cache configuration.

By so doing, the techniques and apparatuses enable this application-specific component to be built with less memory, which permits a smaller die size and reduces costs.

The following discussion describes an operating environment, techniques that may be employed in the operating environment, and a System-on-Chip (SoC) in which components of the operating environment can be embodied. In the discussion below, reference is made to the operating environment by way of example only.

Operating Environment

Figure 1:
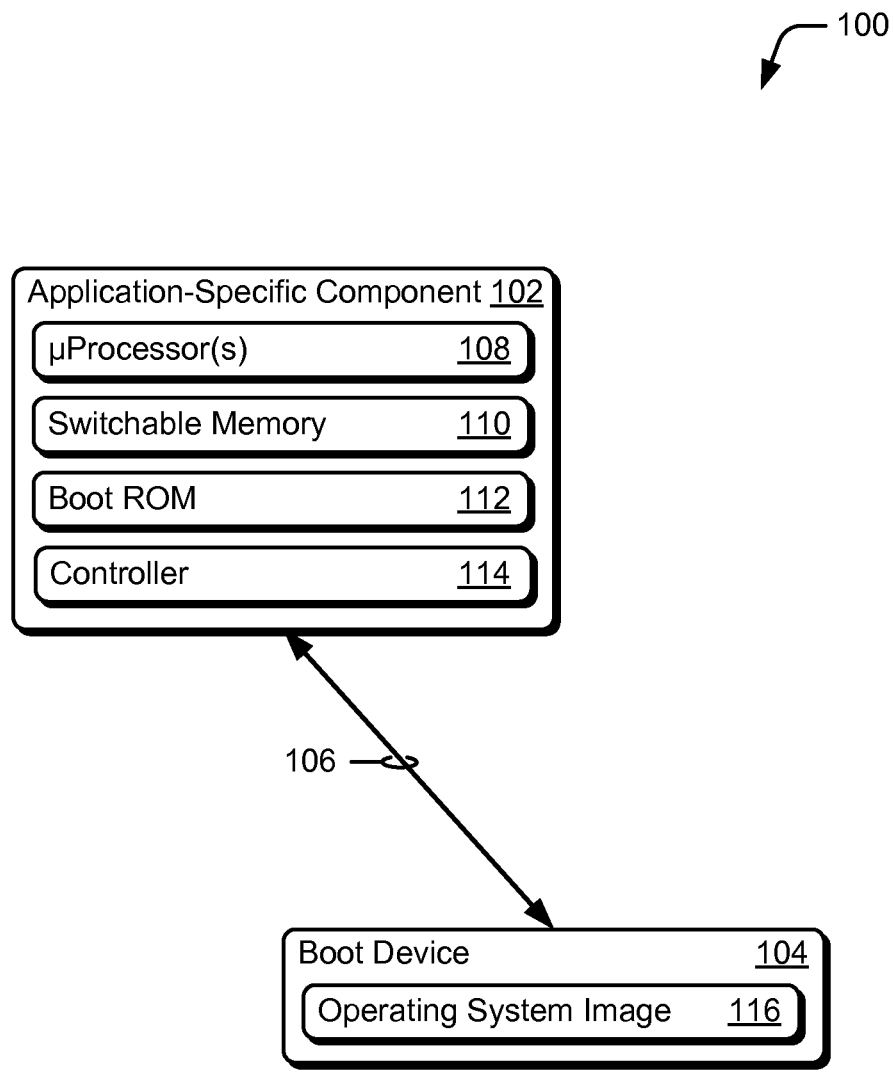
FIG. 1 illustrates an operating environment in which techniques for switching between processor cache and random-access memory may be implemented.

FIG. 1 illustrates an example of an operating environment 100 having an application-specific component 102 and a boot device 104, each of which are configured to communicated over data bus 106, such as an integrated-circuit to integrated-circuit ($I^2C$) bus, a low pin count (LPC) bus, a serial peripheral interconnect (SPI) bus, universal asynchronous receiver/transmitter (UART) bus, 1-wire bus, and the like.

Application-specific component 102 includes one or more micro-processor(s) 108, switchable memory 110, boot read-only memory (boot ROM) 112, and controller 114. Micro-processor 108 can be any suitable type of processor, either single-core or multi-core, for executing instructions or code associated with programs and/or an operating system of application-specific component 102. Micro-processor 108 may be constructed with or fabricated from any suitable material such as silicon and other semiconductors. Switchable memory 110 is memory configured to being switched between at least two configurations, such as a processor cache configuration and a random-access memory (RAM) configuration. Boot ROM 112 may be configured from any suitable non-volatile memory, such as erasable programmable ROM (EPROM), electronically erasable programmable ROM (EEPROM), and the like. Boot ROM 112 includes boot code that, when executed, aids in booting a system that is associated with application-specific component 102. Note that application-specific component 102 is tailored, at least in part, to benefit a specific application, in the above-mentioned example to boot an operating system of a smart-phone.

The techniques and apparatuses, however, are not limited to application-specific components tailored to smart-phones. Instead, various types of application-specific components may be used in conjunction with techniques described herein for deployment in a variety of electronic or computing devices. For example, application-specific components may be configured as integrated-circuits (ASIC), System-on-Chips (SoC), or application-specific standard products (ASSP). Devices in which these application-specific components may be deployed include printers, cameras, copiers, tablet computers, desktop computers, set-top boxes, fax machines, household appliances, gaming devices, mobile internet devices, televisions, electronic books, electronic picture frames, and so on. In some cases an application-specific component may be deployed in multiple such devices with minimal or no reconfiguration.

Controller 114 is configured to switch switchable memory 110 between configurations, such as by dynamically switching between a processor cache configuration and a random-access memory (RAM) configuration. Controller 114 may be embodied in various manners, such as executable code stored in boot ROM 112 for execution by micro-processors 108, a state machine, hardware (e.g., logic circuitry), firmware, or any suitable combination thereof. How controller 114 is used and implemented varies, and is described in more detail below.

Boot device 104 stores operational firmware or an operating system of application-specific component 102. In this particular example, boot device 104 stores operating system image 116. Boot device 104 may be configured from any suitable type of hardware memory or memory device, such as non-volatile RAM (NVRAM), EEPROM, flash memory, and the like. Firmware or operating systems may be stored by boot device 104 in various manners such as an operating system image, firmware modules, microcode, and so on. Alternately or additionally, contents of boot device 104 can be authenticated as secure or trusted code prior to execution in secure-execution environments. Although shown in example environment 100 as separate entities, boot device 104 and application-specific component 102 may be physically integrated in other aspects of the techniques and apparatuses disclosed herein.

Switching Between Processor Cache and Random-Access Memory

The following discussion describes techniques for switching a memory between processor-cache and random-access memory (RAM) configurations. These techniques can be implemented using the previously described environments, such as controller 114 of FIG. 1. These techniques include methods illustrated in FIGS. 2, 3, 5, and/or 6, each of which is shown as a set of operations performed by one or more entities. These methods are not necessarily limited to the orders shown for performing the operations. Further, these methods may be used in conjunction with one another, in whole or in part, whether performed by the same entity, separate entities, or any combination thereof. In portions of the following discussion, reference will be made to operating environment 100 of FIG. 1 by way of example. Such reference is not to be taken as limited to operating environment 100 but rather as illustrative of one of a variety of examples.

Figure 2:
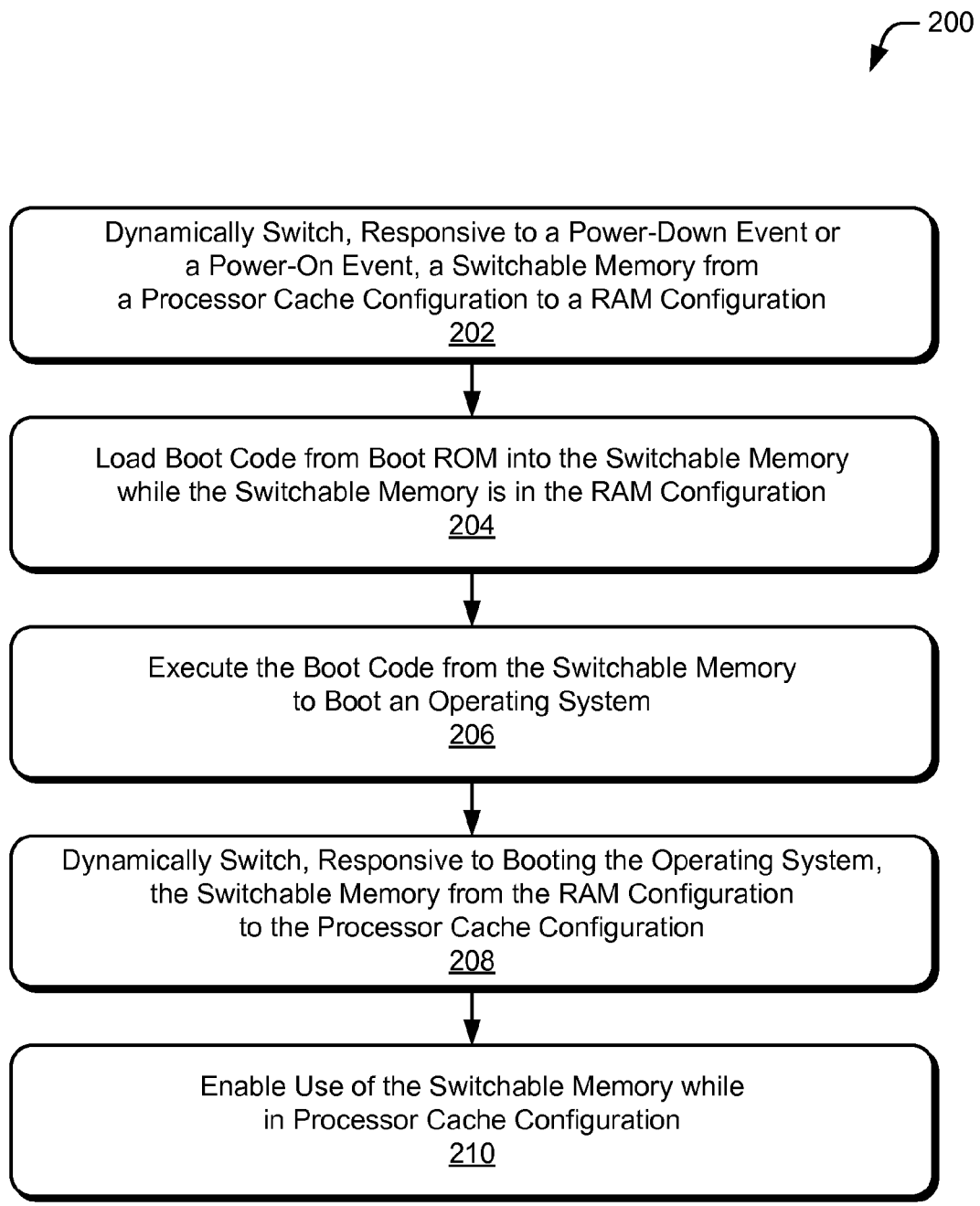
FIG. 2 illustrates a method for switching between processor cache and random-access memory.

FIG. 2 illustrates a method 200 for switching between processor cache and random-access memory. At 202, a switchable memory is dynamically switched, responsive to a power-down event or a power-on event, from a processor cache configuration to a random-access memory (RAM) configuration. A power-down event may include a soft or hard reset, entering a low-power state (e.g., suspend or hibernation modes), complete system shut down, and so on. A power-on event may include a power-on reset (hard or soft), re-boot, cold boot (e.g., system-start from an off state), warm boot, resume from a suspend or hibernation mode, and so on. Consider a case where controller 114 of FIG. 1 receives an indication that a power-down event is occurring or is about to occur. Assume that this power-down event indicates that a computing system (e.g., a desktop computer, smart-phone, laptop computer, tablet computer, gaming system, etc.) is, or will soon be entering, a low-power or unpowered state, such as a hibernate or suspend state. In this case, controller 114, prior to entering the hibernate or suspend state, switches switchable memory 110 from a current processor cache configuration to a RAM configuration in preparation for a later power-on event in which the computing system will be booted.

Controller 114 may instead act responsive to a power-on event, such as a reset or a system-start, to switch the switchable memory to the RAM configuration. In this case, controller 114 dynamically switches switchable memory 110 from an existing processor cache configuration to a RAM configuration in preparation for executing boot code from boot ROM 112. Various manners in which controller 114 may act to switch between configurations, such as a level-two processor cache configuration (L2 configuration) to a static RAM (SRAM) configuration, are set forth in detail as part of methods 500 and 600 of FIGS. 5 and 6 below.

At 204, boot code is loaded from a non-volatile memory into the switchable memory while the switchable memory is in the RAM configuration. The non-volatile memory may be a boot ROM configured to store the boot code as described above. Controller 114, for example, loads boot bode from boot ROM 112 into switchable memory 110 from boot ROM 112 effective to enable execution of the boot code by micro-processor 108. In some cases, the operating system image may be stored on boot device 104 in flash memory. In such a case, controller 114 may use a flash controller to load operating system image 116. As part of booting the computing system, controller 114 may also authenticate operating system image 116.

At 206, boot code is executed from the switchable memory while the switchable memory is configured in the RAM configuration. Execution of the boot code may be effective to boot an operating system or firmware of an application-specific component. The operating system or firmware may be stored in a boot device, such as a flash or EEPROM module internal to or external to the application-specific component. In some cases, the operating system or firmware may be authenticated as trusted or secure prior to booting. Continuing the ongoing example, micro-processor 108 executes boot code from switchable memory 110 to authenticate and boot operating system image 116 from boot device 104.

At 208, responsive to booting the operating system, the switchable memory is dynamically switched from the RAM configuration to the processor cache configuration. In so doing, controller 114 may enable the switchable memory to be used in its prior configuration. For example, while an operating system is being executed, microprocessor 108 may use switchable memory 110 as a cache for data or instructions associated with execution of the operating system or other programs.

Concluding the present example, micro-processors 108 accesses data of switchable memory 110 in the processor cache configuration. This is illustrated at 210, where, after dynamically switching the switchable memory from the RAM configuration to the processor cache configuration, the switchable memory is enabled for use in the processor cache configuration. As noted above, various manners in which controller 114 may act to switch between configurations are set forth in detail below.

Figure 3:
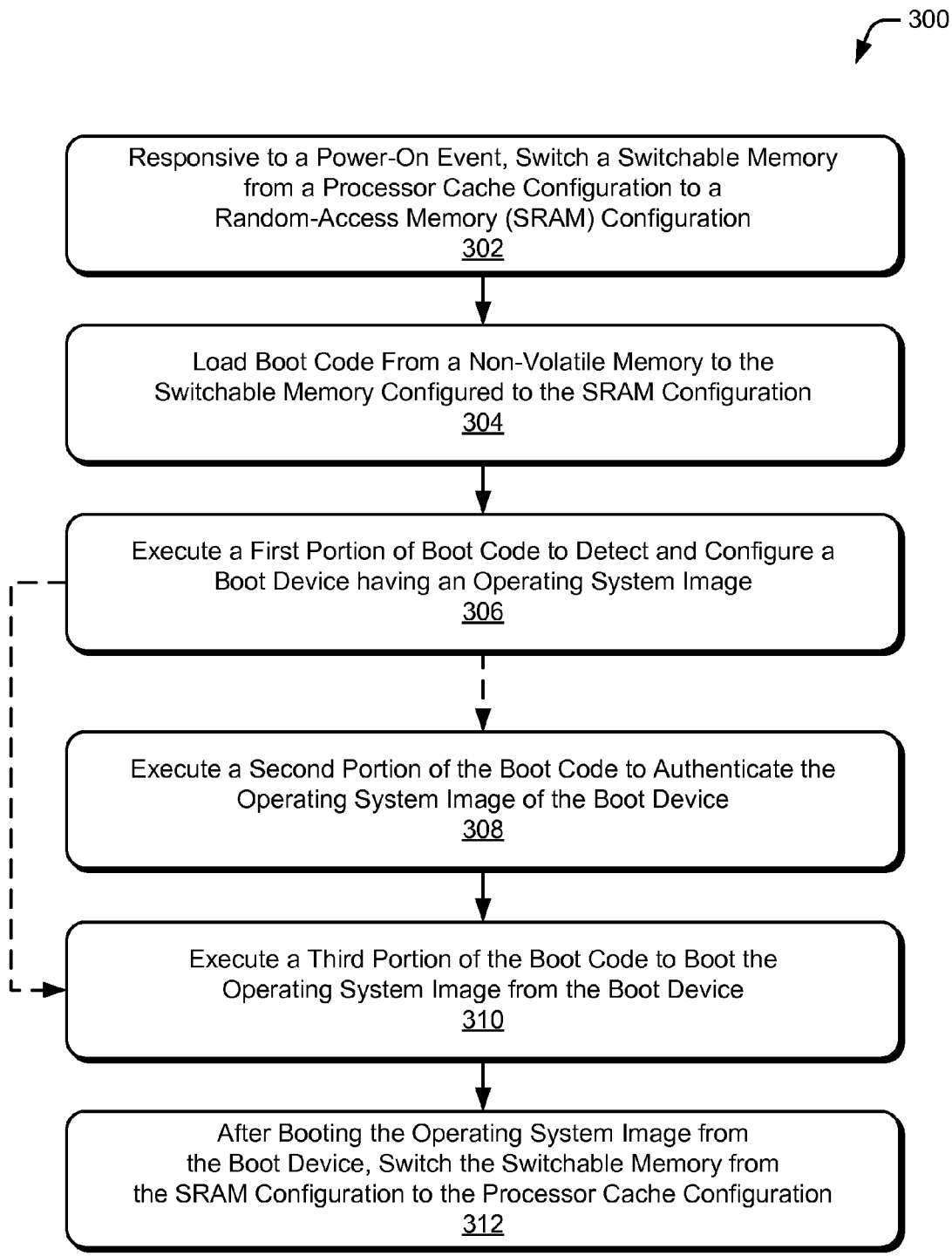
FIG. 3 illustrates a method for booting an operating system, in part by switching a switchable memory from a processor cache configuration to a RAM configuration.

FIG. 3 illustrates a method 300 for booting an operating system, in part by switching a switchable memory from a processor cache configuration to a RAM configuration. In portions of the following discussion, reference will be made to operating environment 100 of FIG. 1 and entities of FIG. 4 by way of example. Such reference is not to be taken as limited to FIG. 1 or 4, but rather as illustrative of one of a variety of examples.

At 302, responsive to a power-on event, switchable memory is switched from a processor cache configuration to a RAM configuration. This power-on event may be a reset, cold boot, or a resume from a low-power mode, such as a sleep or hibernation state.

Figure 4:
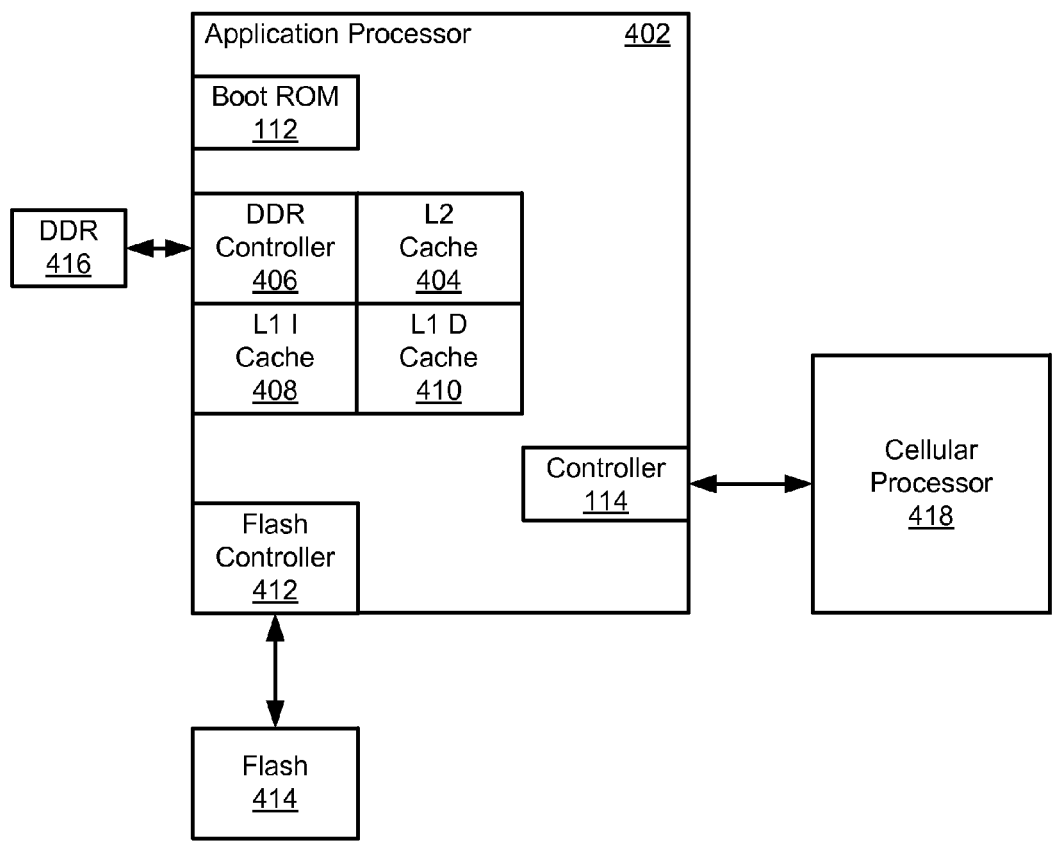
FIG. 4 illustrates an example applications processor including an example of switchable memory using a switchable level-two (L2) processor cache.

By way of example, consider method 300 in the context of application processor 402 of FIG. 4, which is an example of application-specific component 102 of FIG. 1. Application processor 402 includes boot ROM 112 and controller 114 both of FIG. 1, as well as an example of switchable memory 110, here switchable level-two (L2) processor cache 404. Application processor 402 also includes a double data-rate synchronous DRAM controller 406 (DDR controller 406), a level-one (L1) execution translation lookaside buffer (ITLB or I for short) processor cache 408, a level-one (L1) read/write translation lookaside buffer (DTLB or D for short) cache 410, and a flash controller 412. Flash controller 412 is configured to control external flash 414. DDR controller 406 is configured to controlling double data-rate synchronous DRAM 416 (DDR memory 416).

Controller 114 is configured to communicate with and/or be executed using, in whole or in part, cellular processor 418. At 302, a power-on event is detected, such as by a power-management subsystem (not shown) of application processor 402. Here, L2 cache 404 is configured such that its configuration can be altered, including dynamically during a boot process (or conversely during a power-down sequence). At 302, controller 114 switches L2 cache 404, which is configured as processor cache, to a static random-access memory (SRAM) configuration. While the methods are not required to switch this configuration in a particular manner, consider method 500, which provide a detailed embodiment showing how this switching of configuration from an L2 cache configuration to an SRAM configuration may be performed. Method 500 is described in detail below.

At 304, boot code is loaded from a non-volatile memory device into the switchable memory configured to the RAM configuration. Here the boot code is loaded from boot ROM 112 into L2 processor cache 404 of application processor 402.

At 306, a first portion of the boot code is executed effective to detect and configure a boot device. This boot device may store an operating system, an operating system image, or firmware for an application-specific component. The boot device may be configured from any suitable type of memory or memory module, such as an EEPROM or flash memory. Continuing the ongoing embodiment, application processor 402 executes the boot code from L2 cache 404 effective to detect and configure external flash 414. Here, flash controller 412 is used in the detection and configuration of external flash 414, as application processor 402, as presently configured, may not directly access flash memory 414.

Optionally at 308, a second portion of boot code is executed effective to authenticate an operating system image of the boot device as trusted or secure. In some cases, execution or booting of the contents of the boot device may be prevented when authentication fails. In other cases, booting or execution may proceed, while an indication of the failed authentication is presented to a user or reported to a security policy manager. In the context of the present example, application processor 402 executes additional boot code to authenticate an operating system image stored in external flash 414.

At 310, a third portion of the boot code is executed effective to boot the operating system image from the boot device. The boot code, as noted, includes at least some code effective to boot the operating system, though other code, such as executable instructions to perform operations of controller 114, also may be included. In the ongoing example where the operating system image is stored on external flash 414, executing the ROM code from the switchable memory is effective to boot the operating system image from external flash 414 via flash controller 412.

At 312, after the operating system image is booted from the boot device, the switchable memory is switched from the SRAM configuration to the processor cache configuration. This permits other uses of the switchable memory, here permitting the switchable memory to be used as processor cache. Concluding the present example, controller 114 configures L2 cache 404 from the SRAM configuration used to boot the operating system of application processor 402 back to an L2 cache configuration. Consider method 600 as described below, which provides a detailed embodiment showing how this switching of configuration back from an SRAM configuration to an L2 cache configuration may be performed.

Note that the techniques, whether according to method 200, method 300, or a combination thereof, in whole or in part, may perform a trusted or untrusted boot of a computing system (e.g., operation 308).

Figure 5:
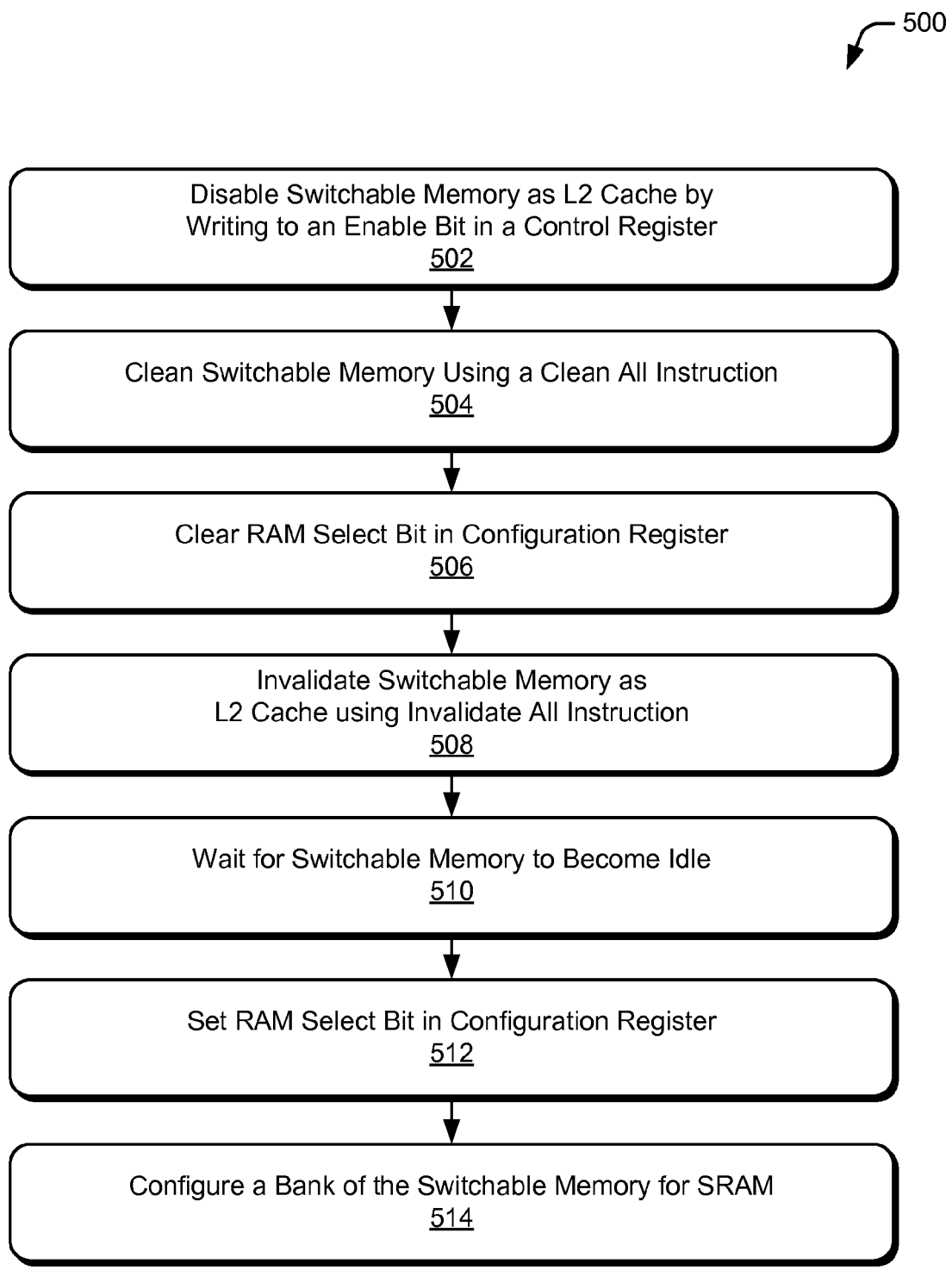
FIG. 5 illustrates a method for switching from an L2 processor cache configuration to an SRAM configuration.

FIG. 5 illustrates a method 500 for switching from an L2 processor cache configuration to an SRAM configuration. Method 500 is but one example way in which the techniques may switch configurations of a switchable memory. As noted, in some cases this permits lower-costs or higher performance by reducing memory on an application-specific component.

At 502, an enable bit of a control register of a switchable memory is written to disable the switchable memory as L2 cache. At 504, the switchable memory is cleaned using a "clean all" instruction. At 506, a select bit in a configuration register of the switchable memory is cleared. At 508, an "invalidate all" instruction is used to invalidate the switchable memory as L2 cache. At 510, methods 500 wait for the switchable memory to become idle. At 512, an SRAM select bit in the configuration register of the switchable memory is set. At 514, a bank of the switchable memory is configured for SRAM.

Figure 6:
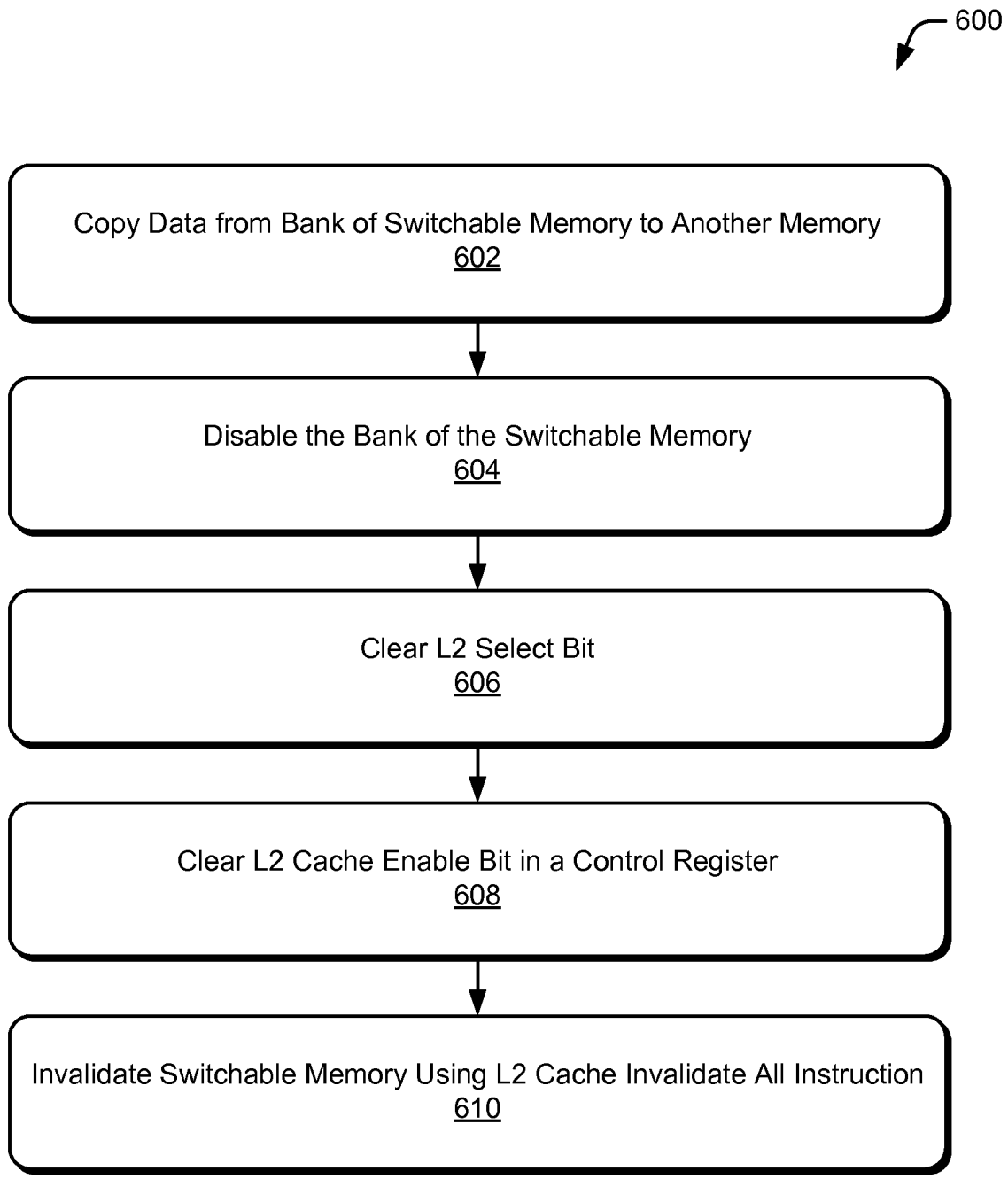
FIG. 6 illustrates a method for switching from an SRAM configuration to an L2 processor cache configuration.

FIG. 6 depicts a method 600 for switching from an SRAM configuration to an L2 processor cache configuration. Method 600 is but one example way in which the techniques may switch configurations of a switchable memory.

At 602, data from a bank of the switchable memory is copied to another memory. Thus, data in the bank of L2 cache 404 configured for SRAM is copied to another memory, such as one external to application processor 402, such as a DDR 416 through DDR controller 406 or external flash 414 through flash controller 412. At 604, the bank of the switchable memory is disabled. At 606, an L2 select bit is cleared. At 608, an L2 cache enable bit in a control register is cleared. At 610, the switchable memory is invalidated using an L2 cache "invalidate all" instruction.

While methods 500 and 600 are performed through particular bits in various registers associated with the switchable memory and using particular instructions, these are intended as examples and not to limit methods 500 or 600, or methods 200 or 300, to these illustrative examples. Alternate aspects are also contemplated, such as the use of logic circuitry or a state machine associated with monitoring and/or controlling power state transitions of an application-specific component.

System-on-Chip

Figure 7:
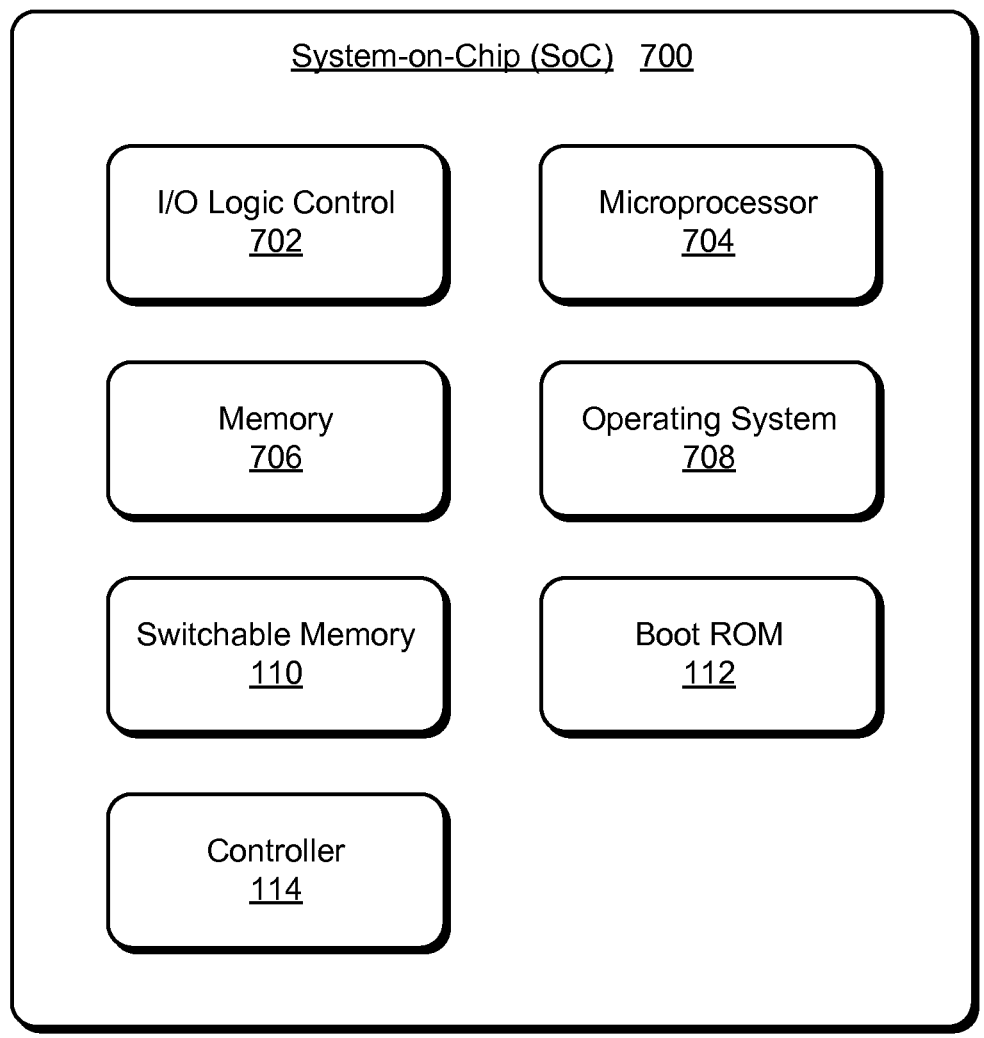
FIG. 7 illustrates a System-on-Chip (SoC) environment for implementing aspects of the techniques described herein.

FIG. 7 illustrates a System-on-Chip (SoC) 700, which can implement various aspects described above. An SoC can be implemented in any suitable device, such as a video game console, IP-enabled television, desktop computer, laptop computer, tablet computer, smart-phone, server, network-enabled printer, set-top box, printer, scanner, camera, picture frame, and/or mobile internet device.

SoC 700 can be integrated with electronic circuitry, a microprocessor, memory, input-output (I/O) logic control, communication interfaces and components, other hardware, firmware, and/or software. SoC 700 can also include an integrated data bus (not shown) that couples the various components of the SoC for data communication between the components.

In this example, SoC 700 includes various components such as an input-output (I/O) logic control 702 (e.g., to include electronic circuitry) and a microprocessor 704 (e.g., any of a microcontroller or digital signal processor). SoC 700 also includes a memory 706, which can be any type of RAM, low-latency nonvolatile memory (e.g., flash memory), ROM, and/or other suitable electronic data storage. SoC 700 can also include various firmware and/or software, such as an operating system 708, which can be computer-executable instructions maintained by memory 706 and executed by microprocessor 704. SoC 700 can also include other various communication interfaces and components, communication components, other hardware, firmware, and/or software.

SoC 700 includes switchable memory 110, boot ROM 112, and controller 114. Examples of these various components, functions, and/or entities, and their corresponding functionality, are described with reference to the respective components of the environment 100 shown in FIG. 1 and FIG. 4. Controller 114 and the other components can be implemented as hardware, firmware, fixed logic circuitry, or any combination thereof that is implemented in connection with the I/O logic control 702 and/or other signal processing and control circuits of SoC 700.

Although the subject matter has been described in language specific to structural features and/or methodological operations, it is to be understood that the subject matter defined in the appended claims is not necessarily limited to the specific features or operations described above, including orders in which they are performed.

What is claimed is:

1. A System-on-Chip (SoC) comprising:
   a switchable memory configured to switch between a second-level (L2) processor cache configuration and a static random-access memory (SRAM) configuration; and
   a controller configured to:
   dynamically switch, responsive to a power-down event or a power-on event, the switchable memory from the L2 cache configuration to the SRAM configuration by:
   disabling the switchable memory as L2 cache by writing to an L2 cache enable bit in a control register;
   cleaning the switchable memory;
   clearing an SRAM select bit in a configuration register;
   invalidating the switchable memory as L2 cache;
   waiting for the switchable memory to become idle;
   setting the SRAM select bit in the configuration register; and
   configuring a bank of the switchable memory for SRAM;
   load boot code from a non-volatile memory into the switchable memory while the switchable memory is in the SRAM configuration, the non-volatile memory being a boot read-only memory (ROM) within the SoC that is configured to store the boot code;
   execute the boot code from the switchable memory while the switchable memory is in the SRAM configuration effective to boot an operating system of the SoC; and
   dynamically switch, responsive to booting the operating system of the SoC, the switchable memory from the SRAM configuration to the L2 cache configuration.

2. The System-on-Chip of claim 1, wherein the SoC does not include a random access memory dedicated for execution of the boot code.

3. The System-on-Chip of claim 1, wherein the controller is further configured to dynamically switch the switchable memory from the L2 cache configuration to the SRAM configuration responsive to the power-down event and prior to the power-on event, the power-down event being a hibernation or suspend mode, the power-on event being a reset or cold boot.

4. The System-on-Chip of claim 1, wherein the controller is further configured to dynamically switch the switchable memory from the L2 cache configuration to the SRAM configuration responsive to the power-on event, the power-on event being a reset from a hibernation mode or a suspend mode.

5. The System-on-Chip of claim 1, wherein executing the boot code is effective to boot the operating system of the SoC from a boot device, the boot device configured to store an operating system image of the operating system.

6. The System-on-Chip of claim 1, wherein the controller is further configured, after dynamically switching the switchable memory from the SRAM configuration to the L2 cache configuration, to use or enable use of the switchable memory while the switchable memory is in the L2 cache configuration.

7. The System-on-Chip of claim 1, wherein the controller is further configured to dynamically switch the memory from the SRAM configuration to the L2 cache configuration by:
copying data from a bank of the switchable memory to a second memory;
disabling the bank of the switchable memory;
clearing an L2 select bit;
clearing the L2 cache enable bit in a control register; and
invalidating the switchable memory.

8. A method comprising:
responsive to a power-on event, switching a switchable memory from a second-level (L2) processor cache configuration to a static random-access memory (SRAM) configuration by:
disabling the switchable memory as L2 cache by writing to an L2 cache enable bit in a control register;
cleaning the switchable memory;
clearing an SRAM select bit in a configuration register;
invalidating the switchable memory as L2 cache;
waiting for the switchable memory to become idle;
setting the SRAM select bit in the configuration register; and
configuring a bank of the switchable memory for (SRAM);
loading boot code from a non-volatile memory to the switchable memory configured to the SRAM configuration, the non-volatile memory being a boot read-only memory (ROM) that is internal to a System-on-Chip within which the switchable memory is integrated and that is configured to store the boot code;
executing a first portion of the boot code from the switchable memory effective to detect and configure a boot device having an operating system image;
executing a second portion of the boot code from the switchable memory effective to boot the operating system image from the boot device; and
after booting the operating system image from the boot device, switching the switchable memory from the SRAM configuration to the processor cache configuration by:
copying data from the bank of the switchable memory to another memory;
disabling the bank of the switchable memory;
clearing an L2 select bit;
clearing the L2 cache enable bit in the control register; and
invalidating the switchable memory.

9. The method of claim 8, wherein the power-on event is a reset, cold boot, resume from a hibernate mode, or resume from a sleep mode.

10. The method of claim 8, wherein the other memory is a dynamic RAM (DRAM) or flash memory external to a System-on-Chip within which the switchable memory is integrated.

11. The method of claim 8, wherein the method is performed by an application specific integrated-circuit (ASIC), a System-on-Chip (SoC), an application processor, or a cellular processor.

12. The method of claim 8, wherein the boot device includes flash memory and executing the second portion of the boot code from the switchable memory is effective to boot the operating system image from the boot device using a flash controller.

13. The method of claim 8 further comprising:
prior to booting the operating system image, executing another portion of the boot code from the switchable memory effective to authenticate the operating system image as a trusted operating system image; and
responsive to a failure to authenticate the operating system image, preventing the operating system image from booting.

14. The method of claim 8 further comprising:
prior to booting the operating system image, executing another portion of the boot code from the switchable memory effective to authenticate the operating system image as a trusted operating system image; and
responsive to a failure to authenticate the operating system image, providing an indication of the failed authentication to a user or a security policy manager.

15. A controller configured to:
dynamically switch, responsive to a power-down event or a power-on event, a switchable memory from a second-level (L2) processor cache configuration to a static random-access memory (SRAM) configuration;
load boot code from a non-volatile memory into the switchable memory while the switchable memory is in the SRAM configuration, the non-volatile memory being a boot read-only memory (ROM) that is internal to a System-on-Chip within which the switchable memory is integrated and that is configured to store the boot code;
execute the boot code from the switchable memory while the switchable memory is in the SRAM configuration effective to boot an operating system; and
dynamically switch, responsive to booting the operating system, the switchable memory from the SRAM configuration to the L2cache configuration by:
copying data from a bank of the switchable memory to another memory;
disabling the bank of the switchable memory;
clearing an L2 select bit;
clearing an L2 cache enable bit in a control register; and
invalidating the switchable memory.

16. The controller of claim 15, wherein the controller is embodied as firmware or logic circuitry within a device having the switchable memory.

17. The controller of claim 15, wherein the controller dynamically switches the switchable memory from the L2 processor cache configuration to the SRAM configuration by:
disabling the switchable memory as L2 cache by writing to the L2cache enable bit in the control register;
cleaning the switchable memory;
clearing an SRAM select bit in a configuration register;
invalidating the switchable memory as L2 cache;
waiting for the switchable memory to become idle;
setting the SRAM select bit in the configuration register; and
configuring a bank of the switchable memory for SRAM.

* * * * *